US009873465B1

(12) United States Patent
Hemphill et al.

(10) Patent No.: US 9,873,465 B1
(45) Date of Patent: Jan. 23, 2018

(54) VEHICLE TAILGATE LOCKING SYSTEM

(71) Applicant: Ford Global Technologies, LLC, Dearborn, MI (US)

(72) Inventors: Joshua Robert Hemphill, White Lake, MI (US); Jack Marchlewski, Saline, MI (US); Dragan B. Stojkovic, Taylor, MI (US); Robert Reiners, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/407,577

(22) Filed: Jan. 17, 2017

(51) Int. Cl.
*B62D 33/03* (2006.01)
*B62D 33/037* (2006.01)

(52) U.S. Cl.
CPC .......... *B62D 33/037* (2013.01); *B62D 33/03* (2013.01)

(58) Field of Classification Search
CPC ... B62D 33/0273; B62D 33/03; B62D 33/037
USPC .................................................. 296/50, 57
See application file for complete search history.

(56) References Cited

U.S. PATENT DOCUMENTS

| 4,202,571 | A  | * | 5/1980  | Nishikoori | E05B 83/16 |
|           |    |   |         |            | 292/216 |
| 6,234,564 | B1 | * | 5/2001  | Kim        | B60J 1/1884 |
|           |    |   |         |            | 296/146.8 |
| 6,276,738 | B1 | * | 8/2001  | Marshall   | B60P 1/26 |
|           |    |   |         |            | 296/37.6 |
| 6,942,268 | B2 |   | 9/2005  | Vejnar     | |
| 8,109,553 | B2 |   | 2/2012  | Zielinsky  | |
| 2005/0035620 | A1 | * | 2/2005 | Ichinose | B60P 1/26 |
|           |    |   |         |            | 296/51 |
| 2006/0001288 | A1 | * | 1/2006 | Thiele   | B60P 1/26 |
|           |    |   |         |            | 296/50 |
| 2009/0250961 | A1 | * | 10/2009 | Townson | B62D 33/0273 |
|           |    |   |         |            | 296/57.1 |
| 2017/0166265 | A1 | * | 6/2017 | Estrada  | B62D 33/037 |

FOREIGN PATENT DOCUMENTS

DE       102005041217 A1    3/2007

* cited by examiner

*Primary Examiner* — Gregory A Blankenship
(74) *Attorney, Agent, or Firm* — Jason Rogers; Brooks Kushman P.C.

(57) ABSTRACT

A vehicle includes a cargo bed, tailgate, and a locking device. The cargo bed has a floor panel. The tailgate has an inner panel and is rotatably secured to the cargo bed. The tailgate is configured to rotate downward to an opened position such that the inner panel is substantially parallel with the floor panel. The locking device is secured to the tailgate. The locking device has a tumbler that is configured to advance a latch to engage the cargo bed and lock the tailgate in the opened position.

20 Claims, 3 Drawing Sheets

VEHICLE TAILGATE LOCKING SYSTEM

TECHNICAL FIELD

The present disclosure relates to tailgate structures for vehicles such as automobiles and trucks.

BACKGROUND

Automobiles, including trucks, may include tailgates that provide access to storage areas such as truck beds.

SUMMARY

A vehicle includes a cargo bed, tailgate, and locking device. The cargo bed has a floor panel. The tailgate has an inner panel and is rotatably secured to the cargo bed. The tailgate is configured to rotate downward to an opened position such that the inner panel is substantially parallel with the floor panel. The locking device is secured to the tailgate. The locking device has a tumbler that is configured to advance a latch to engage the cargo bed and lock the tailgate in the opened position.

A vehicle includes a bed, tailgate, and locking device. The bed has a floor panel. The tailgate has inner and outer panels that define a cavity therebetween. The tailgate is rotatably secured to the bed and is configured to rotate downward from a closed position to an opened position. The locking device is disposed within the cavity and is secured to the tailgate. The locking device has a tumbler that is configured to advance a latch to engage the bed and lock the tailgate in the opened position.

A tailgate includes an internal panel, external panel, and locking device. The internal and external panels define a cavity therebetween. The internal and external panels are secured to each other by a lower panel that defines an orifice that accesses the cavity. The locking device is disposed within the cavity. The locking device has a tumbler that is configured to advance a latch from within the cavity to the exterior of the tailgate via the orifice. The tumbler has an end surface that defines a keyhole and protrudes through the internal panel.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
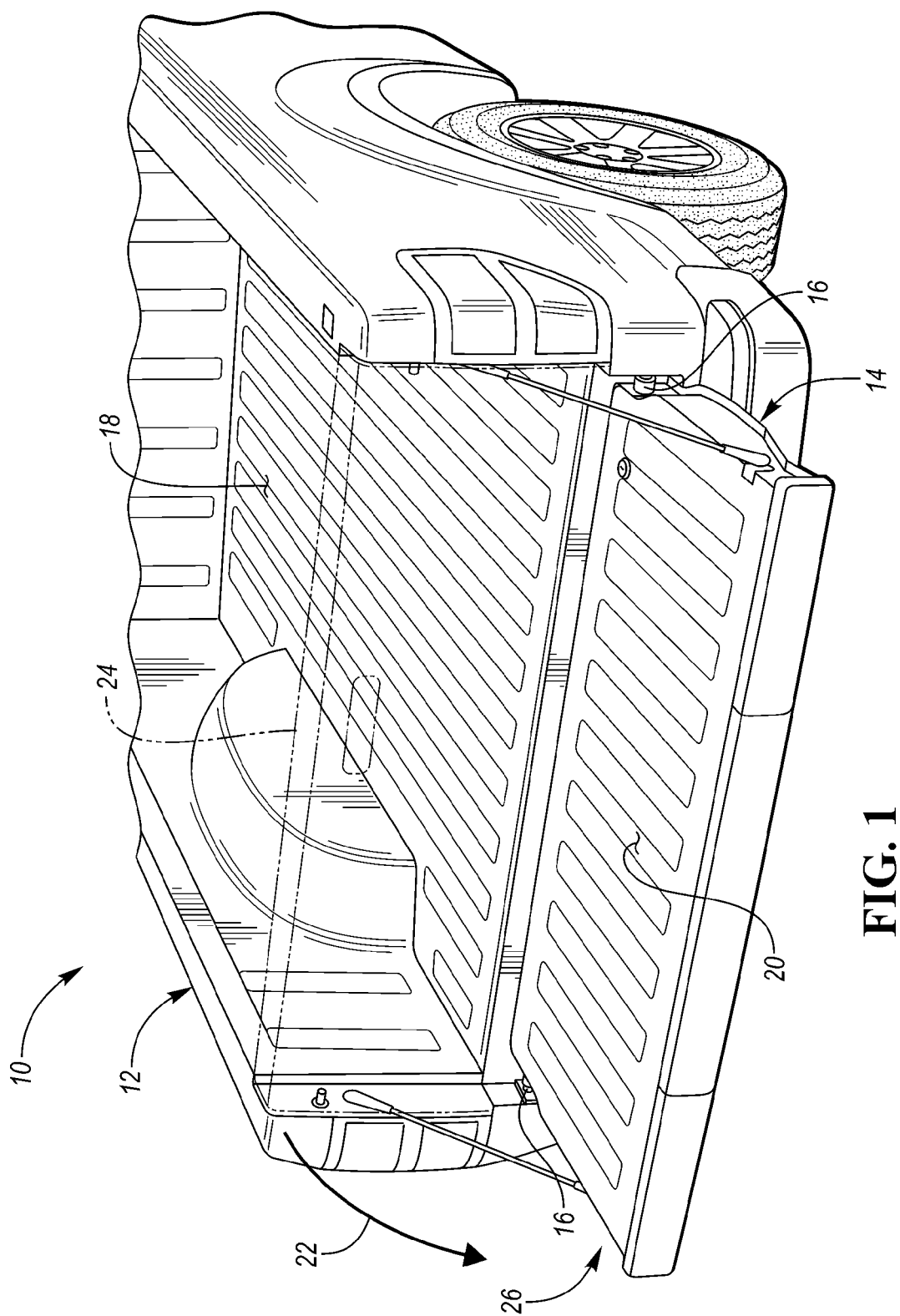
FIG. 1 is a perspective view of a vehicle having a cargo bed and a tailgate.

Referring to FIG. 1, a vehicle 10 is illustrated. The vehicle 10 may be a truck. The vehicle 10 may include a cargo bed 12. A tailgate 14 may be rotatably secured to the cargo bed 12 by a pair of hinges 16. The cargo bed 12 may have a floor panel 18 that is configured to support a cargo load during transportation. The tailgate 14 may include an inner (or internal) panel 20. The tailgate 14 may be configured to rotate downward, as indicated by arrow 22, from a closed position 24 to an opened position 26. The closed position 24 may also be an up position while the opened position may also be a down position. The inner panel 20 of the tailgate 14 may be substantially parallel with the floor panel 18 of the cargo bed 12 when the tailgate 14 is in the opened position 26. Substantially parallel may include any incremental value between minus 10° to plus 10° from exactly parallel. The inner panel 20 of the tailgate 14 may also be substantially coplanar with the floor panel 18 of the cargo bed 12 on the tailgate 14 is in the opened position. Coplanar may include any incremental value between minus 3 inches to plus 3 inches from exactly coplanar. The tailgate 14 may also include a tailgate locking device that is secured to the tailgate 14. The locking device may be configured to lock the tailgate 14 in the opened position 26.

Figure 2:
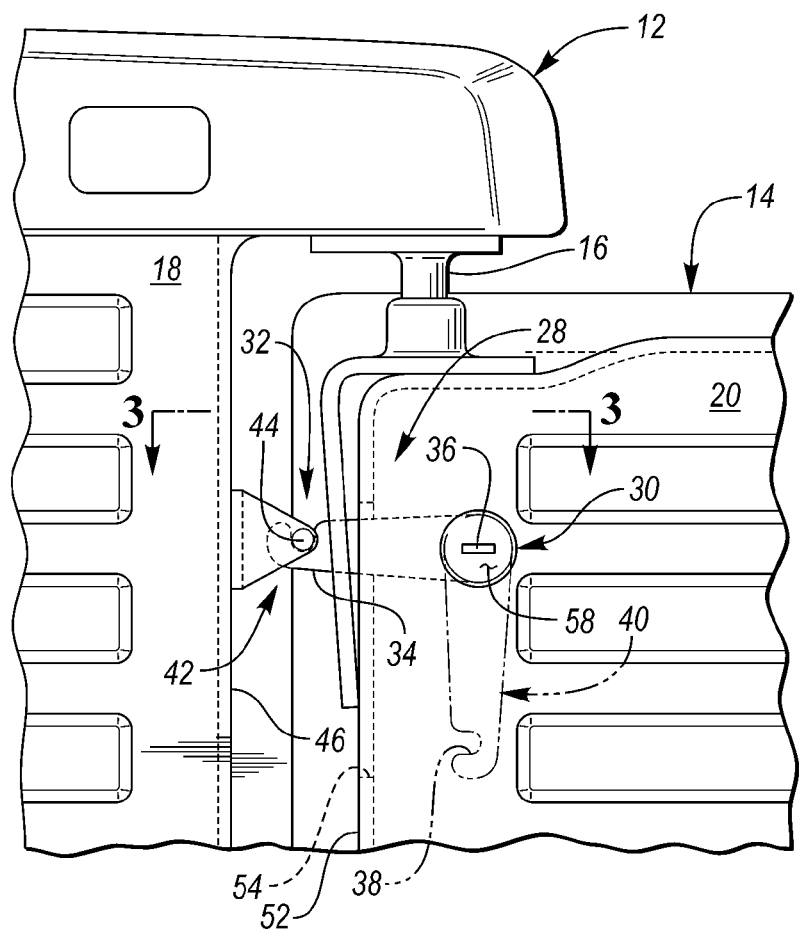
FIG. 2 is a plan view of the cargo bed, tailgate, and a first embodiment of a representative tailgate locking device.
Figure 3:
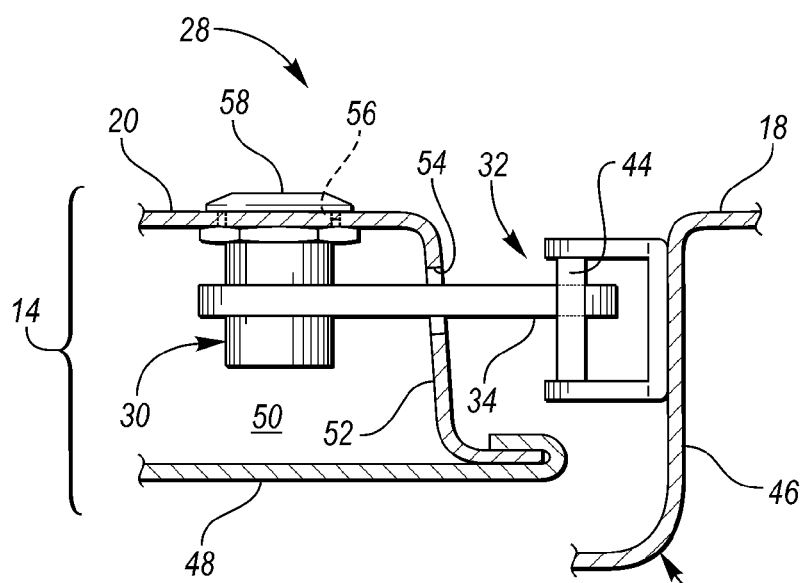
FIG. 3 is a cross-sectional view taken along line 3-3 in FIG. 2.

Referring to FIGS. 2 and 3, the cargo bed 12, tailgate 14, and a first embodiment of the tailgate locking device 28 is illustrated. The locking device 28 includes a tumbler 30 that is configured to advance a latch 32 to engage the cargo bed 12 in order to lock the tailgate 14 in the opened position 26. The tumbler 30 may be any type of tumbler including, but not limited to, tumblers used in pin tumbler locks, wafer tumbler locks, disc tumbler locks, and lever tumbler locks. The latch 32 may include a pivot arm 34 that is affixed to the tumbler 30. The pivot arm 34 may be rigidly affixed to the tumbler 30 and configured to rotate along with the tumbler 30 when a key is inserted into a keyhole 36 defined by the tumbler 30 and rotated. The pivot arm 34 may define a notch 38 that is configured to engage the cargo bed 12 when the pivot arm 34 is rotated from a retracted position 40 an advanced position 42 (by rotating the tumbler 30) in order to lock the tailgate 14 in the opened position 26. More specifically, a vertically oriented pin 44 may be secured to the cargo bed 12 and the tailgate 14 may be locked in the opened position 26 when the notch 38 engages the vertically oriented pin 44. The vertically oriented pin 44 may be secured to a bracket which in turn is secured to a vertically extending rear panel 46 of the cargo bed 12. The vertically extending rear panel 46 may be a sill that extends downward from the floor panel 18 of the cargo bed 12. The bracket that secures the vertically oriented pin 44 to the vertically extending rear panel 46 may be welded or secured to the vertically extending rear panel 46 by at least one fastener. Fasteners may include nuts, bolts, screws, rivets, or any other fastener known to a person of ordinary skill in the art. Alternatively, the vertically extending rear panel 46 may define an orifice and the notch 38 may engage the vertically extending rear panel 46 about a periphery that defines the orifice in order to lock the tailgate 14 in the opened position 26.

In addition to the inner panel 20, the tailgate may include in outer (or external) panel 48. The interior of the inner panel 20 and the interior of the outer panel 48 may define a cavity 50 therebetween. The inner panel 20 and the outer panel 48 may be secured to each other by a lower panel 52. Lower panel 52 may define an orifice 54 that provides access to the cavity 50. The locking device 28 may be secured to the inner panel 20 and disposed within the cavity 50. The tumbler 30 may configured to advance the latch 32 from within the cavity 50 and through the orifice 54 to the exterior of the tailgate 14 in order to engage the cargo bed 12 and lock the tailgate 14 in the opened position 26. More specifically, the tumbler 30 may be configured to rotate the pivot arm 34 from the retracted position 40 and within the cavity 50, through the orifice 54, and to the advanced position 42 and the exterior of the tailgate 14 in order to engage the cargo bed 12 (or vertically oriented pin 44) to lock the tailgate 14 in the opened position 26.

The inner panel 20 may define a second orifice 56 that also provides access to the cavity 50. The tumbler 30 may include an outer surface 58 that defines the keyhole 36. The tumbler 30 may extend from the cavity 50 and through the second orifice 56 such that the outer surface 58 is located on the exterior of the inner panel 20. The tumbler 30 may be welded or secured to the inner panel 20 by at least one fastener. Fasteners may include nuts, bolts, screws, rivets, or any other fastener known to a person of ordinary skill in the art.

Figure 4:
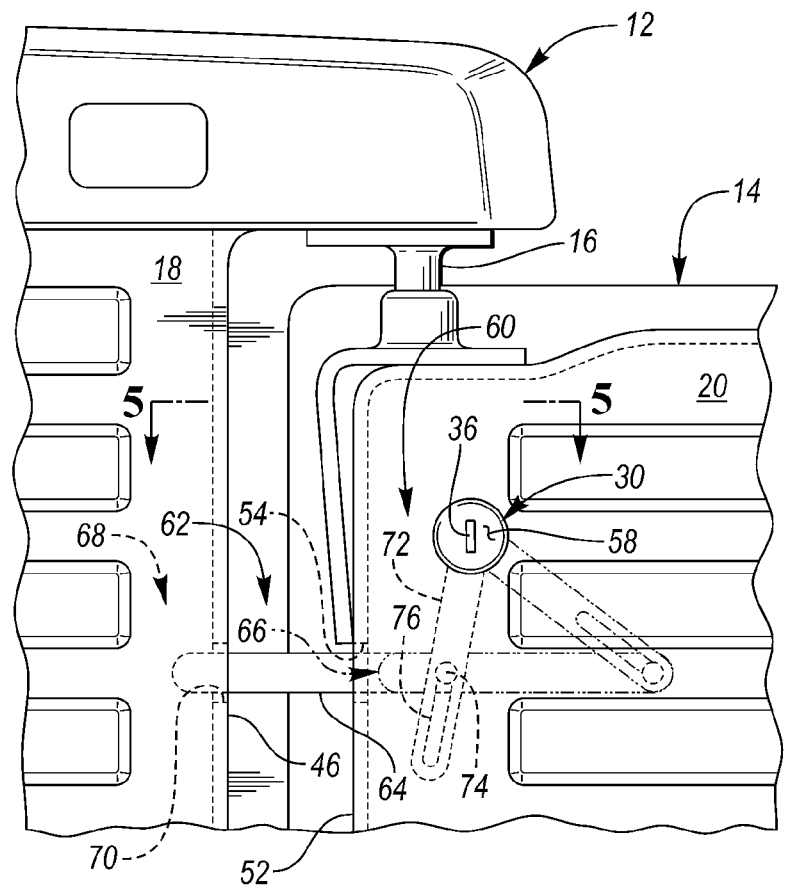
FIG. 4 is a plan view of the cargo bed, tailgate, and a second embodiment of a representative tailgate locking device.
Figure 5:
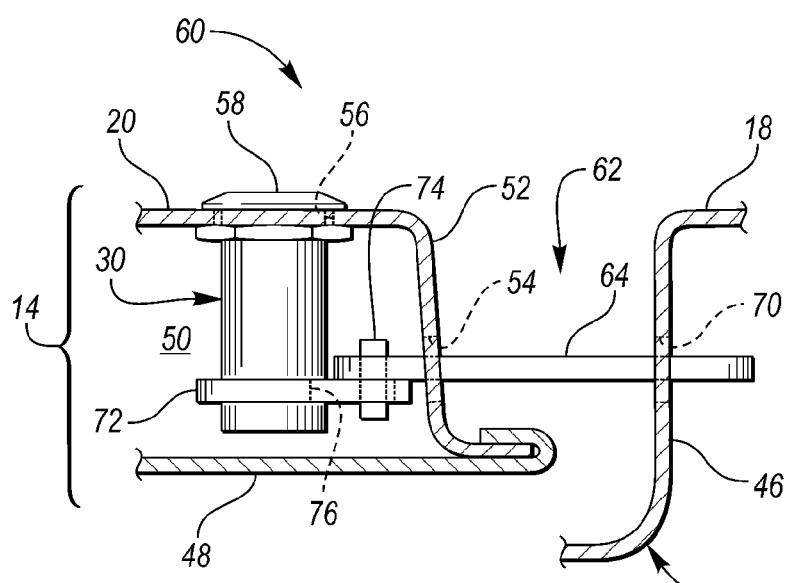
FIG. 5 is a cross-sectional view taken along line 5-5 in FIG. 4.

Referring to FIGS. 4 and 5, the cargo bed 12, tailgate 14, and a second embodiment of the tailgate locking device 60 is illustrated. Any differences between the first embodiment of the tailgate locking device 28 and the second embodiment of the tailgate locking device 60 are specifically described herein. Furthermore, any differences between the cargo bed 12 and tailgate 14 described in FIGS. 4 and 5, when compared to FIGS. 2 and 3, will also be specifically described herein. Otherwise, it should be understood that the cargo bed 12, tailgate 14, and second embodiment of the tailgate locking device 60 described in FIGS. 4 and 5 will include the same characteristics and properties as the cargo bed 12, tailgate 14, and first embodiment of the tailgate locking device 28, respectively, unless described herein.

The locking device 60 includes the tumbler 30 that is configured to advance a latch 62 to engage the cargo bed 12 in order to lock the tailgate 14 in the opened position 26. The latch 62 may include an extension arm 64 is configured to transition between a retracted position 66 and an advanced position 68. The vertically extending rear panel 46 of the cargo bed 12 may define a third orifice 70. The tailgate 14 may be locked in the opened position 26 upon the transition of the extension arm 64 from the retracted position 66 to the advanced position 68 and through the third orifice 70. The latch 62 may include a pivot arm 72 that is affixed to the tumbler 30. The pivot arm 72 may be rigidly affixed to the tumbler 30 and configured to rotate along with the tumbler 30 when a key is inserted into the keyhole 36 defined by the tumbler 30 and rotated. The extension arm 64 may in turn be rotatably secured to the pivot arm 72. The extension arm 64 may be rotatably secured to the pivot arm 72 by a pin 74 that is affixed to the extension arm 64. The pin 74 in turn may engage a slot 76 defined by the pivot arm 72. The extension arm 64 may include a guide (not shown) that is configured to only allow the extension arm 64 to move along a linear path between the retracted position 66 and the advanced position 68. The pin 74 and slot 76 engagement between the extension arm 64 and pivot arm 72 may allow a restricted linear movement of the extension arm 64 that is caused by rotating the pivot arm 72. It should be understood that the pin 74 and slot 76 engagement may be reversed where a pin that is affixed to the pivot arm and engages a slot defined by the extension arm 64.

The tumbler 30 may configured to advance the latch 62 from within the cavity 50 and through the orifice 54 to the exterior of the tailgate 14 in order to engage the cargo bed 12 to lock the tailgate 14 in the opened position 26. More specifically, the tumbler 30 may be configured to rotate the pivot arm 72 to advance the extension arm from the retracted position 66 and within the cavity 50, through the orifice 54, to exterior of the tailgate 14, through the third orifice 70, and to the advanced position 68, in order to lock the tailgate 14 in the opened position 26.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a cargo bed having a floor panel;
   a tailgate having an inner panel and rotatably secured to the bed, the tailgate configured to rotate downward to an opened position such that the inner panel is substantially parallel with the floor panel; and
   a locking device secured to the tailgate and having a tumbler configured to advance a latch to engage the bed and lock the tailgate in the opened position.

2. The vehicle of claim 1, wherein the latch includes a pivot arm that is affixed to the tumbler and defines a notch, and wherein the tailgate is locked in the opened position upon the notch engaging the bed.

3. The vehicle of claim 2, further comprising a vertically oriented pin secured to the bed, and wherein the tailgate is locked in the opened position upon the notch engaging the pin.

4. The vehicle of claim 1, wherein the latch includes an extension arm that is configured to transition between advanced and retracted positions, the bed includes a vertically extending rear panel that is secured to the floor panel and defines an orifice, and the tailgate is locked in the opened position upon transition of the extension arm into the advanced position and into the orifice.

5. The vehicle of claim 4, wherein the latch includes a pivot arm that is affixed to the tumbler and the extension arm is rotatably secured to the pivot arm.

6. The vehicle of claim 5, wherein the extension arm is rotatably secured to the pivot arm by a pin, the pin being affixed to the extension arm and engaging a slot defined by the pivot arm.

7. The vehicle of claim 1, wherein the tailgate includes an outer panel, an interior of the inner panel and an interior of the outer panel define a cavity therebetween, and the tumbler is secured to the inner panel and disposed within the cavity.

8. The vehicle of claim 7, wherein inner panel defines an orifice that accesses the cavity, the tumbler includes an outer surface that defines a keyhole, and the tumbler extends from the cavity and through the orifice such that the outer surface is located on an exterior of the inner panel.

9. A vehicle comprising:
a bed having a floor panel;
a tailgate having inner and outer panels defining a cavity therebetween, the tailgate rotatably secured to the bed and configured to rotate downward from a closed to an opened position; and
a locking device disposed within the cavity, secured to the tailgate, and having a tumbler configured to advance a latch to engage the bed and lock the tailgate in the opened position.

10. The vehicle of claim 9, wherein the latch includes a pivot arm that is affixed to the tumbler and defines a notch, and wherein the tailgate is locked in the opened position upon the notch engaging the bed.

11. The vehicle of claim 10, further comprising a vertically oriented pin secured to the bed, and wherein the tailgate is locked in the opened position upon the notch engaging the pin.

12. The vehicle of claim 9, wherein the latch includes an extension arm that is configured to transition between advanced and retracted positions, the bed includes a vertically extending rear panel that is secured to the floor panel and defines an orifice, and the tailgate is locked in the opened position upon transition of the extension arm into the advanced position and into the orifice.

13. The vehicle of claim 12, wherein the latch includes a pivot arm that is affixed to the tumbler and the extension arm is rotatably secured to the pivot arm.

14. The vehicle of claim 13, wherein the extension arm is rotatably secured to the pivot arm by a pin, the pin being affixed to the extension arm and engaging a slot defined by the pivot arm.

15. The vehicle of claim 9, wherein inner panel defines an orifice that accesses the cavity, the tumbler includes an outer surface that defines a keyhole, and the tumbler extends from the cavity and through the orifice such that the outer surface is located on an exterior of the inner panel.

16. A tailgate comprising:
internal and external panels defining a cavity therebetween and secured to each other by a lower panel that defines an orifice that accesses the cavity; and
a locking device disposed within the cavity and having a tumbler configured to advance a latch from within the cavity to an exterior of the tailgate via the orifice, the tumbler having an end surface that defines a keyhole and protrudes through the internal panel.

17. The tailgate of claim 16, wherein the latch includes a pivot arm that is affixed to the tumbler and defines a notch, and wherein the tailgate is locked in an opened position upon the notch engaging a cargo bed.

18. The tailgate of claim 16, wherein the latch includes an extension arm that is configured to transition between advanced and retracted positions, a cargo bed includes a vertically extending rear panel that is secured to a floor panel and defines an orifice, and the tailgate is locked in an opened position upon transition of the extension arm into the advanced position and into the orifice.

19. The tailgate of claim 18, wherein latch includes a pivot arm that is affixed to the tumbler and the extension arm is rotatably secured to the pivot arm.

20. The tailgate of claim 19, wherein the extension arm is rotatably secured to the pivot arm by a pin, the pin being affixed to the extension arm and engaging a slot defined by the pivot arm.

* * * * *